June 23, 1942.     O. E. SIMMONDS     2,287,142
PIPE COUPLING
Filed Nov. 25, 1940

Inventor
O. E. Simmonds
By
Watson, Cole, Grindle & Watson
Attorneys

Patented June 23, 1942

2,287,142

UNITED STATES PATENT OFFICE 2,287,142

PIPE COUPLING

Oliver Edwin Simmonds, Ripley, England, assignor to Simmonds Development Corporation Limited, London, England Application November 25, 1940, Serial No. 367,124
In Great Britain December 21, 1939

11 Claims. (Cl. 285—126)

This invention relates to pipe couplings of the kind in which the ends of the pipes to be joined are flared so as to form conical mouths and means are provided for drawing the pipe ends together to press the inner surfaces thereof against a packing member that is mounted on a short supporting tube which extends into the pipe ends. The means for drawing the pipe ends together may comprise loose coupling members which embrace the pipes and which engage the outer surfaces of the flared ends, such coupling members screwing one into the other or being adapted to be bolted or otherwise drawn together. Alternatively the coupling members may be formed by flanges integral with the pipe ends.

In order to form a tight joint, the supporting tube has been formed with a shallow annular rib on which the packing member seats. It has also been proposed to form the packing member in two parts, each of which presents a conical face to the flared end of a pipe to be coupled, and to arrange between the packing elements a spring which urges them into contact with the ends of the pipe, the part of the supporting tube between the packing elements being provided with shallow annular ribs against which the packing elements are pressed when the pipe ends are drawn together. It has been found, however, in practice that, when the pipe ends are drawn together, there is a tendency for the packing member to lift away from its supporting tube with the result that the operation of the pipe joint is liable to be impaired owing to leakage. It is the object of the present invention to provide a pipe coupling which is leak-proof and otherwise satisfactory in use.

The invention will be described with reference to the accompanying drawing in which like reference numerals denote like parts and in which.

Figure 1:
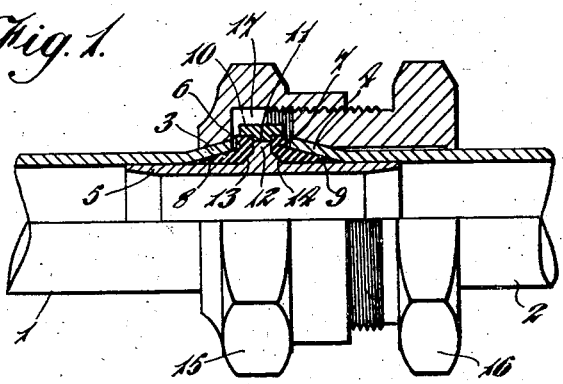
Figure 1 is a partial side elevational view and partial central longitudinal sectional view of the present preferred form of pipe coupling in accordance with the present invention.
Figure 2:
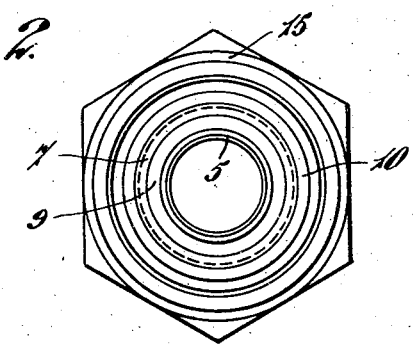
Figure 2 is an end view of the pipe coupling as seen from the right of Figure 1 with the right-hand pipe and screwed sleeve removed.

In the pipe coupling illustrated in Figures 1 and 2, the pipes 1, 2 to be coupled are formed with flared ends 3, 4 respectively into which extends a coaxial supporting tube 5 on which are mounted packing elements 6, 7 formed with conical exterior surfaces 8, 9 respectively for engagement by the inner conical surfaces of the flared pipe ends 3, 4. The supporting tube 5 is a close fit within the pipes 1, 2 and is formed with an annular central rib 12 which extends a substantial distance above the surface of the tube and between the pipe ends. The packing elements 6, 7 seat against the rib 12 on the supporting tube. Arranged over the packing elements 6, 7 is a closely fitting retaining ring 10 having an internal annular rib 11, of rectangular section, extending between the packing elements and closely fitting the circumferential wall of the rib 12 on the supporting tube, the packing elements being a snug fit in the annular recesses formed by the retaining ring, its rib and the rib on the supporting tube. The retaining ring 10 prevents expansion of the packing elements during and after tightening of the coupling whilst the rib 11 on such retaining ring serves to secure the ring in position surrounding the packing elements. The outer part of the rib 12 on the supporting tube is rectangular in cross-section and of the same width as the rib 11 on the retaining ring 10 so that the ribs 11 and 12 together form for each packing element a seating surface that lies in a radial plane. The whole of the rib 12 on the supporting tube may be substantially rectangular in cross-section. Preferably, however, the inner part of the rib 12 is formed with conical surfaces 13, 14, as shown, and the packing elements are formed with corresponding conical surfaces which abut against the conical surfaces 13, 14 on the rib 12, the angles which the conical surfaces 13, 14 subtend at the axis of the coupling being less acute than the angles which the inner surfaces of the flared pipe ends 3, 4 subtend at such axis, so that the flared pipe ends act to press the packing elements tightly against the supporting tube on tightening of the coupling.

The means illustrated for drawing the pipe ends together comprise a coupling nut 15 and screwed sleeve 16 loosely mounted on the pipe ends 3, 4 respectively and formed with conical surfaces for engaging the outer surfaces of the flared pipe ends 3, 4 so that, when the nut and sleeve are screwed together, the pipe ends are drawn together against the packing elements which are pressed tightly against their seats on the supporting tube 5 and the ribs 11 and 12. It will be noted that an annular space 17 is provided within the coupling members in which the retaining ring 10 is housed, thus permitting the coupling to be tightened fully without the coupling members 15, 16 coming into contact with the retaining ring, such coupling members being formed externally with parts of hexagonal contour for engagement by a wrench. Other means for drawing the pipe ends together may be employed.

Figure 3:
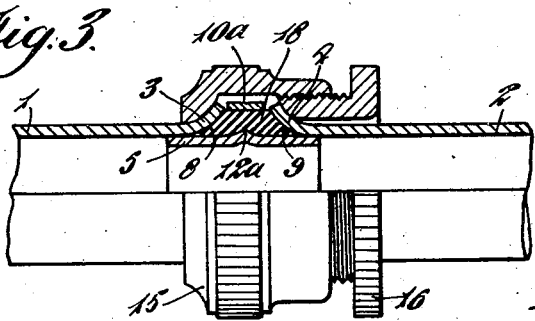
Figure 3 is a side elevational view, partly in section, of a modified form of pipe coupling in accordance with the invention.

In the modified pipe coupling illustrated in Figure 3, a one-piece packing member 18, whose exterior surface is cylindrical at the intermediate portion thereof and conical at the end portions thereof, is mounted on the supporting tube 5 that has a shallow annular rib 12a against which the packing member 18 seats, and lifting of the packing member from its supporting tube is prevented by the retaining ring 10a closely fitting over the packing member.

The packing member may advantageously be made of oil-resisting rubber, though other suitable materials may be employed.

I claim:

1. A pipe coupling comprising pipes to be joined having flared ends forming conical mouths, a supporting tube extending into the pipe ends, a packing member mounted on the supporting tube, said packing member being of one-piece and having its exterior surface cylindrical at the intermediate portion thereof and conical at the end portions thereof, said conical end portions corresponding to the conical mouths of the pipe ends, means for drawing the pipe ends together to press the inner surfaces thereof against the conical outer surfaces of the packing member, and a retaining ring closely fitting over the said intermediate portion of the packing member to prevent the packing member from lifting away from the supporting tube when the pipe ends are drawn together.

2. A pipe coupling comprising pipes to be joined having flared ends forming conical mouths, a supporting tube extending into and closely fitting the said pipes, an external annular rib on the supporting tube, the inner part of said rib being formed with conical surfaces, a packing member mounted on the supporting tube, said packing member being formed in two parts which seat against the said annular rib on the supporting tube and on either side of said rib and being formed with conical surfaces corresponding to and engaged by the conical surfaces on said rib, means for drawing the pipe ends together to press the inner surfaces thereof against the packing member, a retaining ring closely fitting over the packing member, and an internal annular rib on the retaining ring which extends between the two parts of the packing member and which fits closely the rib on the supporting tube.

3. A pipe coupling comprising pipes to be joined having flared ends forming conical mouths, a supporting tube extending into and closely fitting the said pipes, an external annular rib on the supporting tube extending between the pipe ends, a retaining ring having an internal annular rib which closely fits the rib on the supporting tube, the rib on the retaining ring and the outer part of the rib on the supporting tube forming seating surfaces which lie in radial planes and the inner part of the rib on the supporting tube having conical seating surfaces, a packing member formed in two parts and mounted on the supporting tube on either side of the rib thereon, each part of the packing member having surfaces corresponding to and engaged by the seating surfaces formed by the said ribs and having conical surfaces corresponding to and engaged by the inner surfaces of the mouths of the pipe ends, and means for drawing the pipe ends together, the said retaining ring closely fitting over the packing member to prevent such member from lifting away from its supporting tube when the pipe ends are drawn together.

4. A pipe coupling as claimed in claim 3, wherein the angles which the conical surfaces on the rib of the supporting tube subtend at the axis of the coupling are less acute than the angles subtended thereat by the inner surfaces of the flared pipe ends.

5. A pipe coupling comprising pipes to be joined having flared ends forming conical mouths, a supporting tube extending into and closely fitting the said pipes, an external annular rib on the supporting tube extending between the pipe ends, a retaining ring having an internal annular rib which fits closely the rib on the supporting tube, the said retaining ring extending beyond the rib on the supporting tube on either side of said rib, a packing member formed in two parts and mounted on the supporting tube on either side of the rib thereon, the two parts of the packing member having conical surfaces corresponding to and engaged by the conical mouths of the pipe ends and having inner parts snugly fitting the annular recesses formed by the rib on the supporting tube and by the retaining ring and the rib thereon, and means for drawing the pipe ends together to press the inner surfaces thereof against the packing member.

6. A pipe coupling comprising pipes to be joined having widened ends, a supporting tube extending into the said pipes, an external annular rib on the supporting tube extending between the pipe ends, a retaining ring surrounding the rib on the supporting tube and extending on either side thereof, packing elements mounted on the supporting tube and fitting snugly the annular recesses formed by the retaining ring and the rib on the supporting tube, and means for drawing the pipe ends together to press the inner surfaces thereof against the packing elements.

7. In a pipe coupling comprising pipes to be joined having widened ends, a packing member mounted on a support and extending into the pipe ends, and means for drawing the pipe ends together to press the inner surfaces thereof against the packing member, a retaining ring arranged over and closely fitting the packing member so as to prevent the packing member from lifting away from its support when the pipe ends are drawn together.

8. A pipe coupling comprising pipes to be joined having flared ends forming conical mouths, a supporting tube extending into the pipe ends, a packing member mounted on the supporting tube and formed with conical surfaces corresponding to the inner conical surfaces of the pipe ends for engagement therewith and also formed with a substantially cylindrical intermediate portion, means for drawing the pipe ends together to press the inner conical surfaces thereof against the conical surfaces of the packing member, and a retaining ring closely fitting over the substantially cylindrical intermediate portion of the packing member to prevent the packing member from lifting away from the supporting tube when the pipe ends are drawn together.

9. A pipe coupling comprising pipes to be joined having flared ends forming conical mouths, a supporting tube extending into the pipe ends, a packing member comprising two elements mounted on the supporting tube and formed with conical surfaces corresponding respectively to the inner conical surfaces of the pipe ends for engagement therewith, said supporting tube having an external annular rib extending between said elements, means for drawing the pipe ends together to press the inner conical surfaces thereof against the respective conical surfaces of said elements and to press said elements against said rib, and a retaining ring surrounding and engaging said elements to prevent the latter from lifting away from the supporting tube when the pipe ends are drawn together.

10. A pipe coupling comprising pipes to be joined having flared ends forming conical mouths, a supporting tube extending into the pipe ends, a packing member comprising two elements mounted on the supporting tube and formed with conical surfaces corresponding respectively to the inner conical surfaces of the pipe ends for engagement therewith, said supporting tube having an external annular rib extending between said elements, means for drawing the pipe ends together to press the inner conical surfaces thereof against the respective conical surfaces of said elements and to press said elements against said rib, and a retaining ring surrounding and engaging said elements to prevent the latter from lifting away from the supporting tube when the pipe ends are drawn together, said retaining ring having an internal annular rib extending between said elements and closely fitting the rib on the supporting tube.

11. A pipe coupling comprising pipes to be joined having flared ends forming conical mouths, a supporting tube extending into the pipe ends, a packing member comprising two elements mounted on the supporting tube and formed with conical surfaces corresponding respectively to the inner conical surfaces of the pipe ends for engagement therewith, said supporting tube having an external annular rib extending between said elements, means for drawing the pipe ends together to press the inner conical surfaces thereof against the respective conical surfaces of said elements and to press said elements against said rib, and a retaining ring surrounding and engaging said elements to prevent the latter from lifting away from the supporting tube when the pipe ends are drawn together, said retaining ring having an internal annular rib extending between said elements and closely fitting the rib on the supporting tube, said ribs affording substantially radial surfaces for engagement with said elements.

OLIVER EDWIN SIMMONDS.